US005279630A

United States Patent [19]

Brinkmann

[11] Patent Number: 5,279,630

[45] Date of Patent: Jan. 18, 1994

[54] SOOT FILTER FOR DIESEL ENGINES

[75] Inventor: Friedrich W. Brinkmann, Hagen, Fed. Rep. of Germany

[73] Assignee: ERNST-Apparatebau GmbH & Co., Hagen, Fed. Rep. of Germany

[21] Appl. No.: 915,915

[22] Filed: Jul. 16, 1992

[30] Foreign Application Priority Data

Jan. 3, 1992 [DE] Fed. Rep. of Germany ....... 4200100

[51] Int. Cl.[5] .......................... F01N 3/02; B01D 39/20

[52] U.S. Cl. ......................................... 55/282; 55/466; 55/DIG. 10; 55/DIG. 30

[58] Field of Search .................. 422/168; 55/282, 283, 55/466, DIG. 10, DIG. 30

[56] References Cited

U.S. PATENT DOCUMENTS

| | | | |
|---|---|---|---|
| 3,222,140 | 12/1965 | Scivally et al. | 55/DIG. 30 |
| 3,811,845 | 5/1974 | Nakamura | 55/DIG. 30 |
| 4,478,618 | 10/1984 | Bly et al. | 55/314 |
| 4,519,820 | 5/1985 | Oyobe et al. | 55/DIG. 30 |
| 4,659,348 | 4/1987 | Mayer | 55/DIG. 30 |
| 4,704,863 | 11/1987 | Abthoff et al. | 55/DIG. 30 |
| 4,791,785 | 12/1988 | Hudson et al. | 55/DIG. 30 |
| 4,813,231 | 3/1989 | Bykowski | 55/DIG. 30 |
| 4,894,074 | 1/1990 | Mizrah et al. | 55/DIG. 30 |
| 4,913,712 | 4/1990 | Gabathuler et al. | 55/DIG. 30 |
| 5,042,249 | 8/1991 | Erdmannsdoerfer | 55/466 X |
| 5,138,836 | 8/1992 | Pfister | 55/466 X |

FOREIGN PATENT DOCUMENTS

| | | | |
|---|---|---|---|
| 0317515A1 | 5/1989 | European Pat. Off. . | |
| 0442318 | 8/1991 | European Pat. Off. | 55/DIG. 10 |
| 0442318A2 | 8/1991 | European Pat. Off. . | |
| 3614812 | 11/1987 | Fed. Rep. of Germany | 55/DIG. 10 |

*Primary Examiner*—Robert Spitzer

*Attorney, Agent, or Firm*—Herbert Dubno; Andrew Wilford; Yuri Kateshov

[57] ABSTRACT

A soot filter for diesel engines having tubular filter cartridges through the wall of which the exhaust gas passes from without to within and the soot to be burnt off settles on the tube outer wall by a burner, at least some of the filter cartridges are provided with constrictions forming respective first and second areas inside the cartridges and providing the flow resistance through the first areas close to the burner greater than the one through the second areas formed further away from the burner.

9 Claims, 1 Drawing Sheet

SOOT FILTER FOR DIESEL ENGINES

FIELD OF THE INVENTION

The invention relates to a soot filter for diesel engines having tubular filter cartridges through the wall of which the exhaust gas passes from outside and the soot settles on the tube outer wall.

BACKGROUND OF THE INVENTION

In the case of soot filters, it has been shown that the soot layer deposited onto the outer side of the soot filter is not uniformily burnt off by the burner. In particular, the soot layers deposited onto the outermost filter cartridges are insufficiently burnt off in those areas which are remote from the burner.

OBJECTS OF THE INVENTION

The object of the invention is to improve a known soot filter of the type specified in the introduction. Still another object is to provide a soot filter in which the soot layers present on the filter cartridges are burnt off uniformily and as fully as possible.

SUMMARY OF THE INVENTION

This object is achieved according to the invention by the fact that in some of the filter cartridges the flow resistance through the filter cartridge is greater in a first area located closer to the burner or to the flame entrance than in a second area situated further away from the burner.

As a result of this change to the flow resistances of the filter cartridges, a uniform burn-off of the soot layers present on the filter cartridges is successfully achieved, so that the soot filter is optimally exploited and load-times can be lengthened, i.e. the time intervals between two burn-offs can be made longer. The working life of the soot filter is thereby also substantially increased.

According to one embodiment of the invention construction is particularly simple in terms of design if, in the inner cavity of the filter cartridges, a part constricting the inner cavity is disposed between the two areas. The part can be, in this case, a coaxial annular plate or a coaxial bush.

Alternatively, it is proposed that, in the inner cavity of the filter cartridges or on the outer side in the first area, there should be mounted a bush or a tube extending across the length of the first area and exhibiting openings in the wall which increase the flow resistance. The bush or the tube can in this case possess a wall made from a mesh or from a sieve material.

A further alternative can consist in the flow openings or the flow opening channels of the first area exhibiting a greater flow resistance than those of the second area. The flow opening or the flow opening channels of the first area can in this case exhibit a smaller cross-section than those of the second area.

In the case of all illustrative embodiments, it is particularly advantageous if the filter cartridges mounted further outwards from the burner possess a first area which is shorter in the longitudinal direction of the filter cartridges than the cartridges mounted closer to the burner. In addition, in the case of all illustrative embodiments, it is proposed that, where the filter cartridges are disposed further inwards, in particular in the center, the first area should extend over the entire length of the filter cartridges. Where the filter cartridges are further inwards, in particular in the center, the part constricting the inner cavity can in this case be disposed at the end of the filter cartridge.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
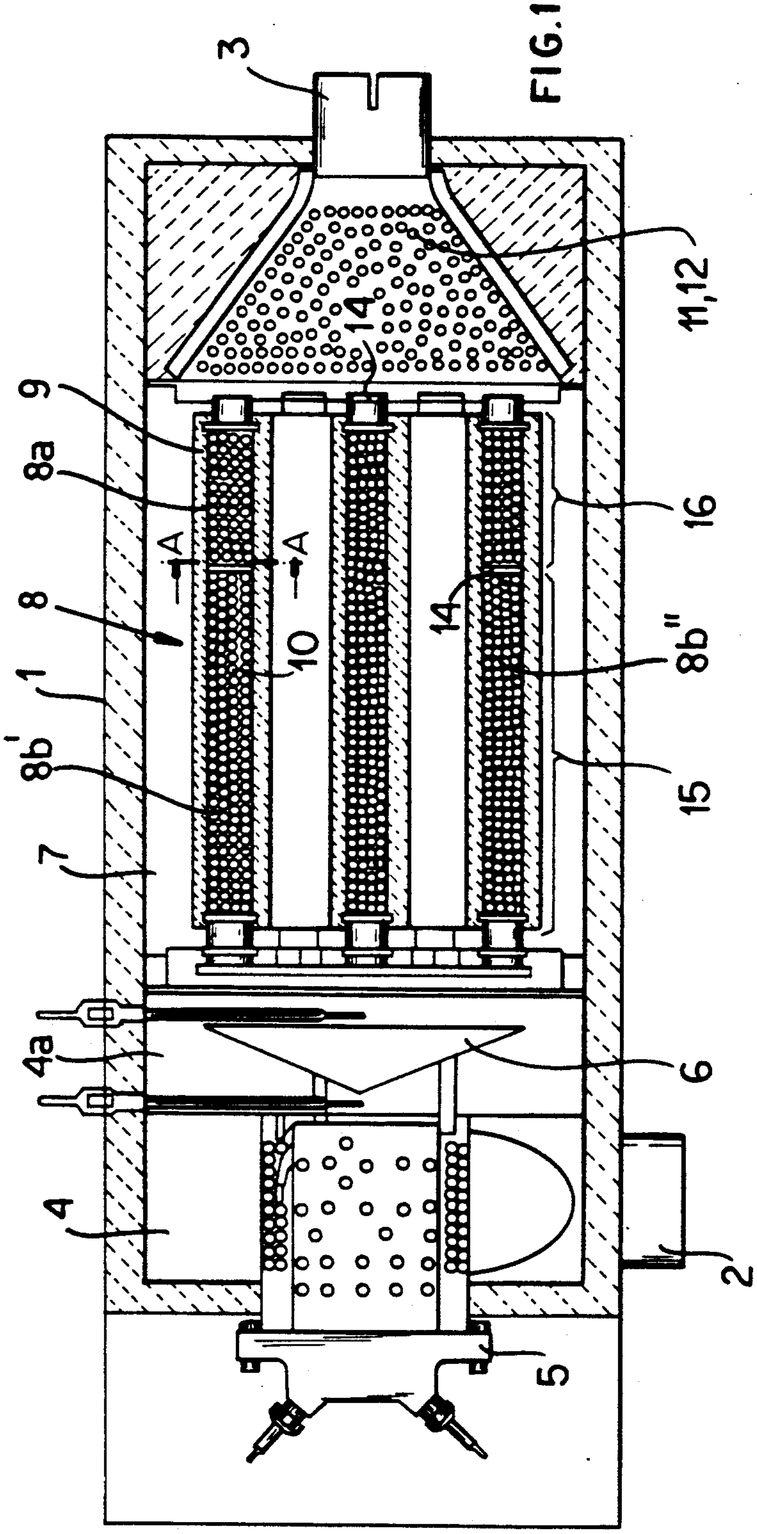
FIG. 1 is an axial longitudinal sectional view of the apparatus according to the invention.

The soot filter includes a housing 1, having a lateral, tangentially disposed inlet 2 and an outlet 3 coaxial with the housing. The inlet 2 leads into an annulus 4, which surrounds a burner 5. The flame gases issuing from the burner 5 are deflected by a guide plate 6 and led into the filter bay 7, in which a considerable number of filter cartridges 8 extend parallel to one another and axially parallel to the housing 1.

In the represented embodiment, the filter cartridges 8 are deep-bed filters having ceramic windings 9 on perforated metal tubes 10. The tubes 10 are closed off on the end facing the burner and open out at their opposite ends into a collecting bay 11 which can be surrounded by a sound absorber 12 and leads to the outlet 3.

The exhaust gases of the diesel engine make their way through the inlet 2 into the annulus 4 and from there, via the combustion chamber **4*a*, into the filter bay 7. They flow through the filter bay 7 and penetrate the cylindrical walls 8*a* of the filter cartridges 8, in order subsequently to flow through the interior of the filter cartridges 8 into the collecting bay 11 and to the outlet 3. The soot present in the exhaust gases is thereby deposited as a layer in the ceramic windings 9** and on the outer side, which layer is not represented in the drawing.

In the inner cavity **8*b*' and 8*b*'', at least in two filter cartridges 8 spaced radially and on a housing axis, there is an annular plate 14 or a bush fastened coaxially with a respective filter coaxially which forms a flow resistance. This annular plate 14 divides the filter cartridge 8 into a first area 15 and a second area 16, the flow resistance of the filter cartridge 8 being greater in the area 15 located axially closer to the burner 5 than in the second area 16 facing away from the burner 5**.

Figure 2:
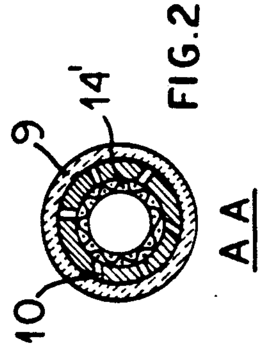
FIG. 2, is a cross sectional view taken along lines A—A in FIG. 1 and shown an embodiment of the invention.

The flame gases reach further into the filter bay 7 and are thus able to reach and burn off the soot layers deposited further from the burner 5. This advantageous effect is achieved by the annular plates 14 in a manner which is particularly simple in design terms and which optimally exploits the filter cartridge walls. Alternative embodiments to this, which are not represented in the drawing, are described below:

In place of the annular plate 14, a tube 14 shown in FIG. 2 can also be laid in the inner cavity **8*b*', 8*b*'' of the area 15, which tube extends over the length of the first area and exhibits openings in the wall in order to increase the flow resistance. In this case, the tube can consist of a mesh or a sieve surface. In a further alternative, a tube of this kind can be disposed on the outer side of the tube 10 in the first area 15 between the tube 10 and the winding 9. In addition, it is also however possible for the flow openings or the flow channels of the first area 15 to exhibit a smaller cross-section than those of the second area 16**.

Figure 3:
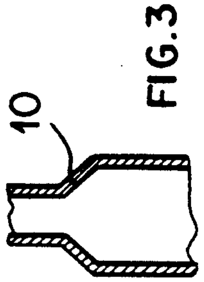
FIG. 3 is a diagrammatic axial sectional view showing another embodiment according to the invention.

In a further alternative embodiment shown in FIG. 3, the metal tubes 10 forming the filter inner cavity can be tapered inwards, in particular in an annular shape, at the point for creating the increased flow resistance.

The chosen length of the first area 15 can vary substantially in the case of the filter cartridges 8. It is particularly advantageous if, in the case of the filter cartridges with cavities 8*b*' and 8*b*" the first area 15 is shorter than that of the cartridge 8*b*. In FIG. 1 the first area 15, in the case of the first coaxial filter cartridge, extends over its entire length, so that the annular plate 14 is fastened at the outlet of the filter cartridge 8. This has the additional effect that the flow resistance of all filter cartridges is approximately equal. It can be advantageous in this case for the annular plates 14 to possess variously sized openings in order to achieve the respectively required flow resistance for each of the different filter cartridges 8.

I claim:

1. A soot filter for diesel engines, the soot filter comprising:

a housing centered on a housing axis and formed with an interior extending along the axis and having an inlet end and an axially opposite outlet end;

a burner mounted on said housing at the inlet end and producing a flame extending axially in the housing toward the outlet end;

means on the inlet end of said housing forming an inlet for soot-carrying gases flowing axially into and along said interior toward the outlet end;

means on the outlet end of said housing forming an outlet coaxial with said housing and spaced axially from said inlet; and a plurality of tubular filter cartridges in the housing interior spaced axially from said inlet and mounted in said interior spaced angularly from one another, said cartridges extending along respective cartridge axes parallel to said housing axis and forming axially extending flame passages, each of said cartridges being formed with:

a gas-porous peripheral wall having and extending axially between upstream and downstream ends, each downstream end being in flow communication with said outlet, each upstream end being blocked, filter means on the wall for filtering the soot-carrying gases upon penetrating thereof inside the cartridge to strip soot from the soot-carrying gas as same passes inward through the wall and thereby leave a layer of soot on the wall of the cartridge, an inner cavity delimited by the respective wall between the respective ends, and constricting means including a crosswise partition in the cavity between the ends thereof for generating a flow resistance differential in the cavity between downstream and upstream regions of the cavity of the cartridge defined between the constricting means and the respective downstream and upstream ends of the cartridge, so that the flame extending along the flame passages is able to reach upstream regions of each the cartridges and uniformly burns off the soot layer on the walls.

2. The soot filter defined in claim 1 wherein each of the crosswise partition is an annular plate.

3. The soot filter defined in claim 1 wherein each of the crosswise partitions is a bush coaxial with the respective cartridge.

4. The soot filter defined in claim 3 wherein each bush extends axially in the respective cartridge and is formed with a respective peripheral wall provided with openings.

5. The soot filter defined in claim 4 wherein the peripheral wall of each bush is made of a mesh or sieve material.

6. The soot filter defined in claim 1 wherein the walls of the cartridges are tapered axially toward the outlet in the vicinity of the crosswise partition.

7. The soot filter defined in claim 1, further comprising at least one other filter cartridge in a center of the plurality of the cartridges and formed with a respective downstream region.

8. The soot filter defined in claim 7 wherein the downstream region of the other filter cartridge is longer than the downstream regions of the plurality of filter cartridges.

9. The soot filter defined in claim 7 wherein the downstream region of the other filter cartridge extends over an entire length of the other filter cartridge.

* * * * *